United States Patent
Ehrenfried et al.

[15] 3,663,881
[45] May 16, 1972

[54] CONTINUOUS POSITION SENSING SYSTEM

[72] Inventors: Albert D. Ehrenfried, Concord; John Niejadlik, Littleton; Norton T. Pierce, Concord, all of Mass.

[73] Assignee: Metritape, Inc., West Concord, Mass.

[22] Filed: Dec. 12, 1969

[21] Appl. No.: 884,598

[52] U.S. Cl..............................318/663, 318/666, 338/205
[51] Int. Cl. .........................................................G05b 1/06
[58] Field of Search ..................318/575, 666, 663; 187/29; 200/81.9; 73/301; 338/205

[56] References Cited

UNITED STATES PATENTS

| | | | |
|---|---|---|---|
| 1,580,363 | 4/1926 | Baruch | 187/29 |
| 2,416,059 | 2/1947 | Marchment | 338/158 X |
| 2,897,426 | 7/1959 | Hotine | 318/663 |
| 2,900,468 | 8/1959 | Joy | 200/81.9 |
| 2,942,736 | 6/1960 | Landsiedel et al. | 318/575 X |
| 2,943,905 | 7/1960 | Godet | 318/575 X |
| 3,153,342 | 10/1964 | Pierce et al. | 73/301 |
| 3,297,925 | 1/1967 | Masel | 318/663 |
| 3,462,569 | 8/1969 | Schooley | 335/205 X |
| 3,511,090 | 5/1970 | Ehrenfried et al. | 73/301 |

*Primary Examiner*—Benjamin Dobeck
*Attorney*—Weingarten, Maxham & Schurgin

[57] ABSTRACT

A system for the precise and spatially-continuous determination of position along a predetermined path, capable of efficient operation even over relatively large distances. The system employs a unique elongated sensor capable of providing a signal directly related to the position of an actuating force applied thereto. The tape sensor is positioned along a path of travel, and means for actuating the sensor is coupled to an object whose position is to be determined. The system is operative to provide position control as well as position indication and can be adapted to provide self-monitoring during system operation.

24 Claims, 20 Drawing Figures

Patented May 16, 1972

INVENTORS
ALBERT D. EHRENFRIED
NORTON T. PIERCE
JOHN NIEJADLIK

BY Joseph Weingarten
Stanley M. Schurgin
ATTORNEYS

Patented May 16, 1972

INVENTORS
ALBERT D. EHRENFRIED
NORTON T. PIERCE
JOHN NIEJADLIK

ATTORNEYS

INVENTORS
ALBERT D. EHRENFRIED
NORTON T. PIERCE
JOHN NIEJADLIK

ATTORNEYS

INVENTORS
ALBERT D. EHRENFRIED
NORTON T. PIERCE
JOHN NIEJADLIK
BY
ATTORNEYS

CONTINUOUS POSITION SENSING SYSTEM

FIELD OF THE INVENTION

This invention relates to position sensing systems and more particularly to systems for the spatially-continuous monitoring and control of position over relatively large distances.

BACKGROUND OF THE INVENTION

In many industrial applications, there is need for precise indication and control of large scale displacements of moving elements such as machine parts, transfer vehicles, and carriages. Typical applications which require such position sensing and control are elevators, bridge cranes, tripper car systems, machine operated slides, conveyors, material flow and waterway gates and valves, XY positioning drives, and the like. With the increasing automation of industrial systems and processes, there is a growing need for the automatic positioning and control of such vehicles or structures which can be controlled from a remote central operating station.

Where small translations of a few inches or fractions of an inch are involved, the conventional practice has been to convert translatory motion into a rotational motion, for example by means of a rack and pinion or belt drive over a pulley wheel, and measure the resultant rotary motion with a potentiometer coupled to the rotary shaft. In certain instances translatory potentiometers having an elongated wire wound resistance element with a translatory sliding contact have been employed, but such potentiometers are, in practice, limited to only a few inches of travel and require mechanical linkages to couple the potentiometer to a moving object being monitored. To detect relatively small scale displacements, electronic proximity devices have been employed, and optical techniques are often used for extremely fine displacement measurements such as for precise linear determination of the position of machine tool elements.

None of the approaches described thus far lend themselves to detection of displacements over relatively large distances of, for example, tens to hundreds of feet. For such large displacements, the ancillary mechanisms required to couple the moving object to the electrical sensor system are physically unwieldy and inaccurate. Moreover, the electrical sensors conventionally employed are usually exposed to the environment which is often of a contaminating nature, and proper system operation is thereby affected.

For such relatively large displacements, the conventional approach has been one of point position indication usually by means of cam-actuated microswitches, or by proximity-type switches utilizing photoelectric, magnetic, or capacitive sensors. In such point position systems, the sensor usually is located at a fixed position along the path of a moving object, closure of a particular sensor indicating that the moving object is at the location of the sensor. When employed in a position control system, such point indication sensors are often used to interrupt motor drive current or to apply braking drive. The output signals of such sensors may also be employed to operate multi-speed motors for stepwise increase or decrease of the moving object velocity.

The point position indicators conventionally employed in position sensing and control systems suffer several disadvantages which detract from their performance and from overall system efficiency and accuracy. It will be appreciated that point position sensors are on-off devices that can only determine whether a moving object is in the vicinity of the sensor; such sensors cannot locate the moving object precisely when it is disposed in a position between adjacent sensors. Thus, such point indicating sensors do not lend themselves to the spatially-continuous positioning of moving objects such as carriages, elevators, or other structures. Attempts to increase the precision of systems utilizing such discrete bistable sensing devices require the use of a great number of closely spaced sensor switches and can give rise to oscillation or hunting of the moving object as the control system attempts to position the object within closely spaced preset limits.

Moreover, it is evident that each point sensing device requires separate lead wires to be run from its position in an installation to a centralized control station. As a result, a great number of wires are required in practical installations in which a great number of discrete point sensing devices are required, with corresponding increase in wiring costs and electrical maintenance. In addition, in many operating environments, the point sensing devices are mounted in positions subject to physical damage during normal system operation and are often exposed to dust, dirt, rain, snow, and other environmental stresses which are physically and electrically damaging to system operation.

As discussed hereinabove, the point indicating devices conventionally employed for position determination over large distances cannot provide continuous displacement determination and cannot therefore be employed in those positioning systems known as proportional control systems. In such proportional control systems a continuously determinable error signal must be provided which is directly proportional to the distance of a moving object from its intended position. Such an error signal is usually employed in a servo drive system to cause the movable object to move at progressively slower velocities as the object nears its ultimate desired position. The vehicle velocity is reduced smoothly to zero when the destination is reached, causing a minimum of overshoot and position error. Although such proportional control is widely employed in controlling movable objects over rather small excursions, it has not heretofore been practical to provide such proportional control over distances of tens and hundreds of feet because there has not been an appropriate continuous position sensor available for these larger distances.

SUMMARY OF THE INVENTION

In accordance with the present invention, a precise spatially-continuous position determining system is provided in which smooth and consistent position measurement is achieved with uniform effectiveness even over relatively large distances. The system employs a unique elongated continuous sensor capable of providing a resistance directly related to the position of an actuating force applied thereto. The continuous sensor is positioned along the path of travel of a movable object, the object containing a means for actuating the sensor as the object moves along its path of travel. The actuating means can be a mechanical roller or other suitable element adapted for pressure contact with the elongated sensing element as the object moves along its path. Alternatively, the actuating means can be of non-contacting type, such as an air jet. The novel sensor can be utilized as a two-wire rheostat or three-wire potentiometer to provide precise and continuous position signals for analog or digital position indication and control of a moving object.

The system according to the invention is especially adapted for use in machines and mechanical motion translation applications where relative motion or displacement between two parts of a machine or between a vehicle or other object and a fixed structure or between two moving objects is to be measured and controlled. Such mechanical motion may involve straight line or curvilinear travel along one direction or within a three-axis coordinate system. It is a particular feature of the invention that continuous position information is provided throughout the path of travel and automatic drive systems can therefore be given precise commands based on such position information.

Depending on whether rheostat or potentiometer connections are employed in a particular system, only two or three lead wires are required from the sensor to the control center, rather than the large number of wires required by arrays of point position detectors conventionally employed along a path of travel. No wiring is required along the path of travel itself since the novel continuous sensor provides the complete electrical configuration necessary for position determination. The electrical system of the sensor is sealed from the environment and is electrically actuable throughout its length without danger of contamination. Smooth proportional control is achievable over relatively large paths of travel since continuous position information is provided by the invention. Moreover, the system according to the invention lends itself to self monitoring to easily detect system failures without complex additional apparatus and without interfering with system operation.

DESCRIPTION OF THE DRAWINGS

The invention will be more fully understood from the following detailed description, taken in conjunction with the accompanying drawings, in which.

DETAILED DESCRIPTION OF THE INVENTION

Figures 1, 2:
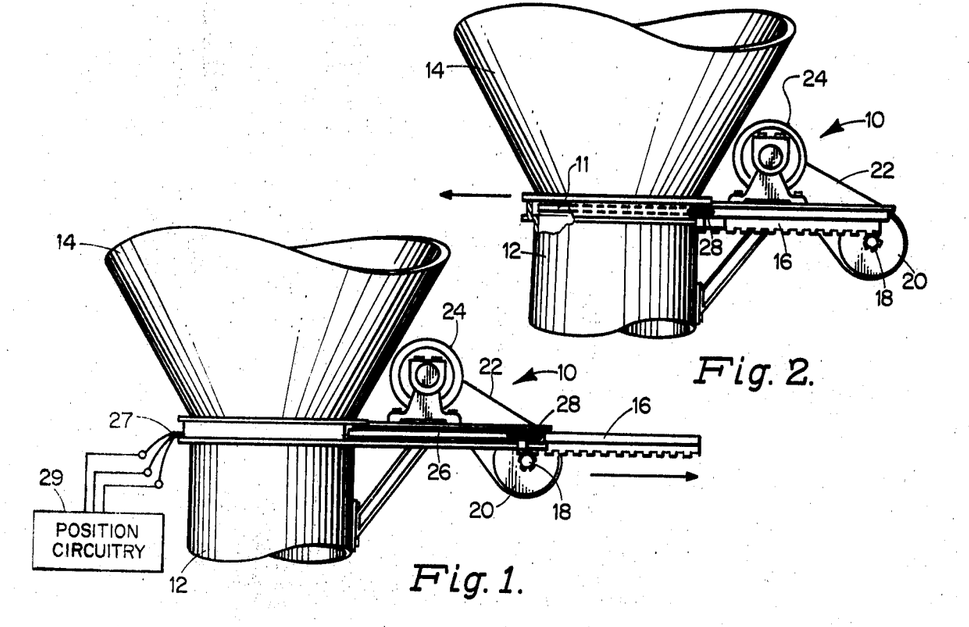
FIG. 1 is an elevation view, partly cut away, of a gate valve assembly employing a continuous position system in accordance with the invention.
FIG. 2 is an elevation view, partly cut away, of the gate valve assembly of FIG. 1 showing the valve gate in its fully closed position.

A continuous position sensing system is illustrated in FIG. 1 as embodied in a gate valve assembly employed, for example, to store dry bulk material such as grain. Referring to FIG. 1, the gate valve assembly 10 is disposed in an outlet port 12 of a dry bulk storage bin, only the lower portion 14 of which is illustrated. The valve gate is a horizontally disposed plate 11 disposed within channels provided for the purpose and adjustable to a fully closed position, a fully open position and selected intermediate positions for egulation of the flow of materials from bin 14 through outlet port 12. The valve gate is adjusted by means of a rack 16 attached thereto, the rack being driven by a pinion 18 which is mounted on a common shaft with a pulley 20. Pulley 20 is coupled by means of a belt 22 to a pulley which in turn is attached to a motor 24 which provides motive force for gate operation. Activation of motor 24 in a first or a second direction will cause corresponding clockwise or counterclockwise rotation of pinion 18 and corresponding translatory motion of rack 16 in a rightward or leftward direction to thereby open or close the valve gate coupled thereto. In FIG. 1, rack 16 is depicted in its fully extended position, which occurs when the valve is fully open. With the valve in its fully closed position, as illustrated in FIG. 2, rack 16 is retracted to its leftmost position.

According to the invention, the position of the gate valve is continuously sensed by a unique and relatively simple position determining means. The invention permits the continuous monitoring of valve position anywhere in its path of travel, and, if desired, position data can be employed in a control system to provide automatic control of valve gate position. Unique position determination is provided by an elongated sensor 26 disposed along the path of travel of rack 16 which is employed to drive the valve gate 11 to its respective positions. The sensor is capable of providing a resistance directly related to the position of an activating force applied thereto, and the resistance measurement or corresponding voltage measurement is employed to indicate position. Electrical lead wires 27 are provided to permit connection to associated circuitry 29 for determination and/or control of valve gate position. Such circuitry will be described hereinbelow.

The activating force is provided in the illustrated embodiment by a mechanical roller 28 attached to the leftmost end of rack 16 and adapted for rolling contact along the length of sensor 26 as rack 16 is driven leftward or rightward by its associated driving pinion 18.

Figures 3, 4, 5:
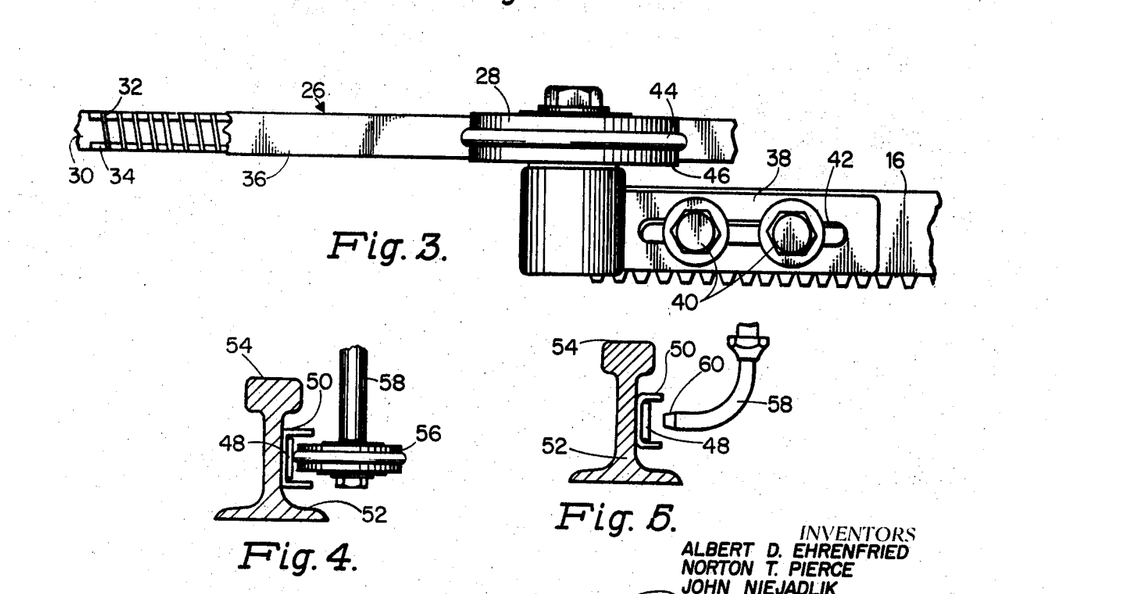
FIG. 3 is an elevation view, partly cut away, of the sensor and roller contact of the embodiment of FIGS. 1 and 2.
FIG. 4 is an elevation view, partly in section, of the invention as employed along a trolley rail.
FIG. 5 is an elevation view, partly in section, of an alternative embodiment of the invention.

The position monitoring means are illustrated more clearly in FIG. 3. The sensor 26, which provides a resistance directly related to the position of pressure roller 28 along its length, includes a conductive base strip 30 about which is wound a helix of resistance wire 32. The resistance wire helix is insulated from the base strip by means of an interposed insulating layer 34 such that the resistance wire contacts the base strip only at a point of activation by contacting roller 28 or other activating forces. The sensor structure itself is described in detail in U.S. Pat. No. 3,153,342 and copending patent application Ser. No. 739,868, filed June 25, 1968, both assigned to the assignee of the present invention. Details of sensor construction can be varied from that shown in the above-identified patent and patent application to suit the operating environment of the present invention. A mechanically resilient jacket 36, which may be composed of one or more layers of material, provides an outer protective cover for the sensor and completely encloses the inner electrical system, which includes the helix of resistance wire 32 and conductive base strip 30.

The inner electrical system of the unique sensor is thus isolated from the environment and precise and reliable position data can be provided by the invention even under adverse environmental conditions, such as are often experienced in practice. For example, gate valve assemblies, such as that illustrated hereinabove, often operate in the presence of dirt, dust and moisture, all of which can seriously affect the electrical performance of conventional position sensing systems. Such contaminants, however, do not affect proper operation of the invention since the position sensor is sealed from the environment and is substantially immune to environmental contamination.

The elongated sensor 26 is actuable throughout its length to provide continuous and accurate position information. The actuating force is provided by contact roller 28 attached to one end of rack 16 by means of a mounting plate 38. Mounting plate 38 is connected to rack 16 by bolts 40 which pass through an elongated opening 42 provided along the length of mounting plate 38 and the associated portion of rack 16. Contact roller 28 can thereby be adjusted to initially calibrate the position determining system. Contact roller 28, as illustrated in FIG. 3, includes a rubber or other resilient tire 44 mounted on a flanged rim 46, the tire 44 being of a width less than the exposed width less than the exposed width of base strip 30 defined by the wrapped around edges of insulation 34 such that, upon contact by roller 28, one or more of the turns of resistance wire 32 will contact the underlying base strip 30 to make electrical connection therewith and provide a resistance indication representative of roller position along the effective length of the sensor.

For many position monitoring applications the novel sensor can be mounted in a protective channel which is disposed on a rail or track on which an object being monitored is arranged to move. Referring to FIG. 4, a sensor 48 is mounted such as by an adhesive to an inner wall of an elongated channel 50 which itselfis mounted to the web portion 52 of a rail 54. An activation roller 56 rotatably disposed on a mounting shaft 58 is provided in contacting relationship with sensor 48, the contacting roller assembly being adapted for movement along the length of the sensor with motion of an object whose position is being monitored as it travels along rail 54. It will be appreciated that the path of travel of the object being mointored can be a straight or curved path.

Activation of the sensor need not be by mechanical contact but in many instances can be by a non-contacting force such as a gas blast. Such non-contacting activation is illustrated in FIG. 5 in which a sensor 48 mounted in a channel 50 is shown attached to a rail 54 as in FIG. 4. A nozzle 58 is attached to a suitable source of position gas pressure (not shown) and has an orifice 60 disposed adjacent sensor 48 and operative to direct a blast of air or other suitable gas onto the confronting surface of the sensor sufficient to activate the sensor as described hereinabove by contact of one or more turns of resistance wire with the underlying base strip. Nozzle 58 is coupled to an object travelling on rail 54, and activation of sensor 48 by the gas blast from the nozzle provides a continuous indication of object position along the length of the sensor.

Figure 6:
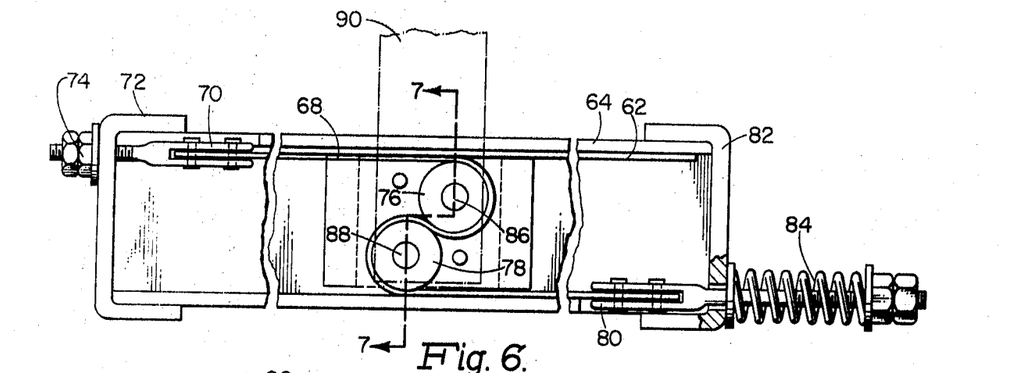
FIG. 6 is an elevation view of a further embodiment of the invention.
Figures 7, 10:
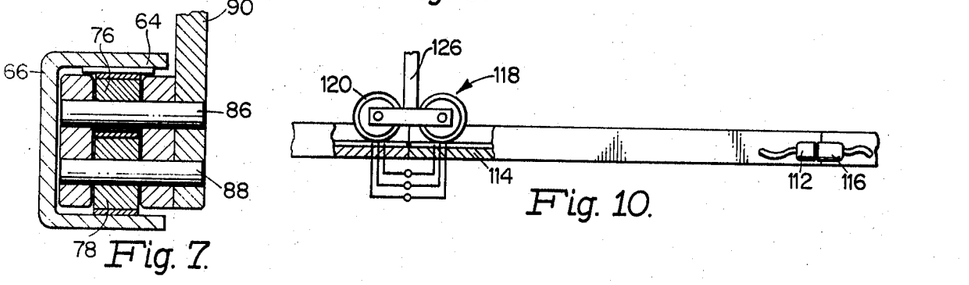
FIG. 7 is a sectional view taken along lines 7—7 of FIG. 6.
FIG. 10 is a pictorial view of a further embodiment of the invention employing a segmented sensor.

An alternative embodiment of the invention is illustrated in FIGS. 6 and 7 which depict a sensor energized by translatory tensioned steel band known as a Rolamite. A sensor 62 is disposed on the inner wall of member 64 of channel 66. A steel band 68 passes in an S-shaped configuration over rollers 76 and 78 and thence along the wall of channel 66 opposite to sensor 62 to an anchor 80 attached to mounting plate 82 by a spring loaded assembly 84 which is operative to adjust the tension in steel band 68. Rollers 76 and 78 are rotatable about respective shafts 86 and 88, these shafts being attached to a plate 90 which is connected to a movable object whose position along the length of sensor 62 is to be determined.

In operation, as plate 90 moves along the length of sensor 62 the steel band 68 tends to wind onto one roller and unwind from the other roller, depending upon the direction of travel. The steel band is of a width less than the width of the exposed portion of base strip 30 which confronts the associated turns of resistance wire 32, and the steel tape is operative at its tangent point to roller 76 to cause sufficient force to activate the sensor. The sensor can be continuously activated throughout its length in accordance with movement of plate 90 and its associated roller assembly along the active length of sensor 62.

Figure 8:
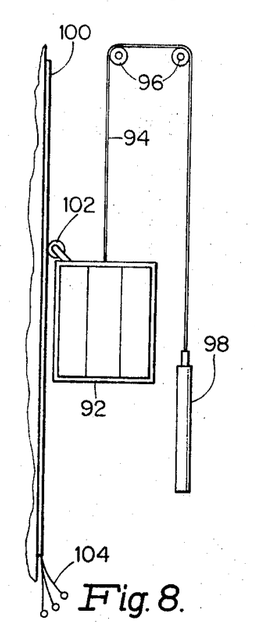
FIG. 8 is a diagrammatic elevation view of the invention as embodied in an elevator control system.

An embodiment of the invention is illustrated in FIG. 8 for determination of the position of an elevator within a shaft. An elevator 92 is supported within its shaft by a cable 94 disposed over pulleys 96 and attached at its opposite end to a counterweight 98. A sensor 100 according to the invention is vertically disposed on an inner wall of the elevator shaft. Typically, the sensor can be disposed within a mounting channel such as described hereinabove. Activation of the sensor is accomplished by a contacting roller 102 attached to elevator 92 and adapted to make positive contact with the sensor throughout its length as elevator 92 moves up and down within the shaft. Three lead wires 104 are provided from metering tape 100 to provide potentiometer connections to suitable position determining circuitry, to be described hereinbelow.

The resistance of sensor 100 varies directly with the position of contacting roller 102 along the length thereof, and the sensor output provides an accurate measure of the position of elevator 92 in its travel along the length of the sensor 100 associated with the elevator shaft. Control of elevator position is afforded by the invention in a more efficient manner than conventional position determining systems, which are discretely actuated by movement of the elevator. Since there is a practical limit to the number of switches which can be employed, the position of the elevator is only known at discrete intervals and continuous position data is not practically achievable by such conventional systems. In the preset invention, however, such continuous position information is continuously available, and thus accurate positioning of elevator 92 is achieved by use of the unique sensor 100 which provides all data necessary for continuous position monitoring and control. Since continuous position data is provided by the invention, proportional speed control can be provided to control the velocity and acceleration of elevator 92. Such proportional control will be described in detail hereinbelow.

Figure 9:
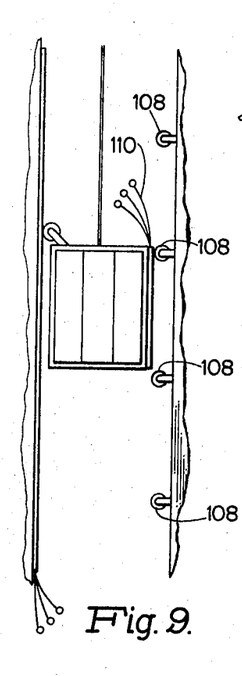
FIG. 9 is a diagrammatic elevation view of an alternative embodiment of the system of FIG. 8.

In those instances where position is to be determined over relatively great distances, of the order of several hundred feet or more, it is often desirable to employ a first sensor along a path of travel to provide course position information, and to provide a second shorter sensor for fine position determination. Such a system as embodied in an elevator position monitor is depicted in FIG. 9, identical to the embodiment of FIG. 8, with the addition of a second sensor 106 vertically disposed on a side of elevator 92. Actuating contacts for sensor 106 are provided by a plurality of contacting rollers 108 mounted at predetermined intervals along the length of the elevator shaft, each of which is operative to contact sensor 106 when elevator 92 is within a predetermined zone within the elevator shaft. Three lead wires 110 provide potentiometer connection to the control circuitry (to be described) such that course determination of the position of elevator 92 is provided by sensor 100, while fine position determination is provided by sensor 106.

For versatility of installation, the elongated sensor can be fabricated in sections of selected length which are adapted for interconnection with like sensor sections to accommodate particular paths of travel. An effectively continuous elongated sensor can thus be provided with an active length to suit particular requirements. Such an embodiment is illustrated in FIG. 10 to which reference is now made. Each section comprises a sensor 112 disposed within a channel 114, with electrical connection being made at each end 112 to a respective electrical terminal 116. Adjacent sections are interconnected by terminal wires 118, or, alternatively, electrical interconnection can be provided by suitable plug-in or other well known connectors. The confronting end portions of adjacent sensor sections will not be responsive to an actuating force since each end has an inactive portion for end termination. A double-wheeled contacting roller assembly 118 is provided to bridge this inactive end portion and to provide effectively continuous actuation of the overall elongated sensor.

Contact roller assembly 118 includes first and second wheels 120 and 122 which can be similar to the rubber-tired wheels described above in connection with FIG. 3. Wheels 120 and 122 are connected along a common rolling axis by a mounting frame 124 which includes an upstanding member 126 adapted to be connected to a moving object whose position is to be determined. The separation between the respective points of contact of wheels 120 and 122 and the underlying sensor is slightly greater than the length of the inactive end sections of the confronting sensor sections such that one wheel is able to contact an active portion of one section as the other wheel leaves the active portion of the adjacent section. Thus, continuous contact is made as assembly 118 moves from one sensor section to the next, with the result that continuous position information is derived as in the single sensor embodiments described above.

Figure 11:
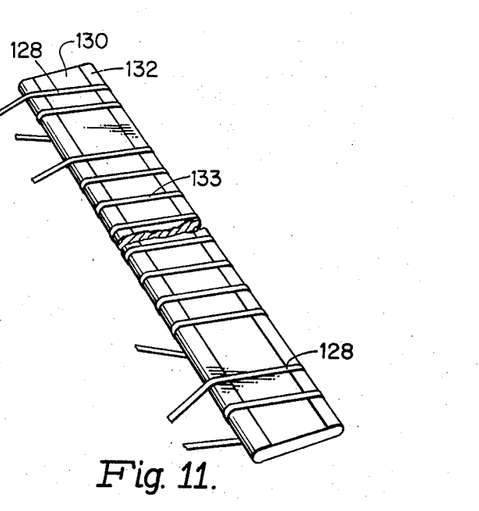
FIG. 11 is a pictorial view, partly cut away, of a further embodiment of a sensor embodied in the invention.

For some purposes, it is useful to provide a unique indication to denote that an object being monitored has reached an end of its path of travel. A sensor operative according to the invention to provide such end of travel indication is illustrated in FIG. 11 and includes separate windings on each end of the sensor, each winding being operative in the presence of an actuating force to provide an output signal representative of a terminal position. Each end winding is formed of one or more turns of wire 128 helically wound around base strip 130 and spaced therefrom in the absence of an actuating force by the novel interposed insulation 132 as described hereinabove. The helically wound wire 128 in this instance can be either of resistive material, as is sensor winding 133, or of a highly conductive material, since only a single signal is uniquely derived from these end windings in the presence of an actuating force, and resistance measurement is not required.

Figure 12:
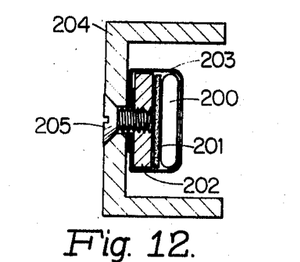
FIG. 12 is a sectional elevation view of a further mounting arrangement according to the invention.

The sensor is typically mounted within a protective channel, such as shown in FIGS. 4 and 5, which can be made of any material suiting the particular environment in which it is employed. For example, the channel can be made of aluminum, steel or plastic, such as polystyrene or polypropylene, and the sensor secured to the mounting channel by a suitable adhesive. Alternatively, the sensor can be secured to its mounting channel by fasteners provided along the length thereof, such as depicted in FIG. 12. A sensor 200 is adhered on the side opposite its actuation surface to a double-sided adhesive member 201, the opposite side of which is adhered to the confronting surface of relatively stiff and thick metal backing plate 202. A resilient Mylar or other suitable outer jacket 203 is provided around the structure just described, and backing plate 202 is rigidly secured to the inner wall of channel 204 by machine screws 205 threaded into holes provided along the length of mounting plate 202. The mounting plate 202 is effective to securely mount the sensor within the protective channel without affecting the sensitivity of the sensor to an actuating force applied thereto. Outer jacket 203 is relatively resilient and does not materially detract from sensor performance.

Figure 13:
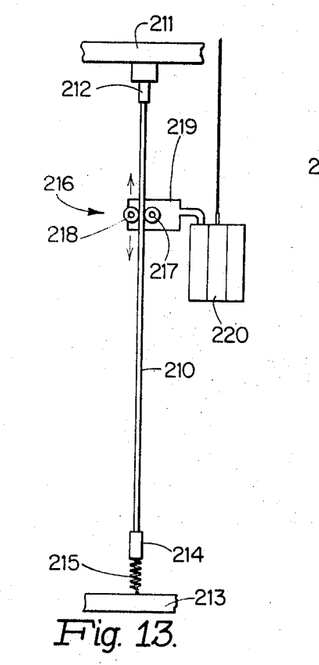
FIG. 13 is a diagrammatic elevation view of a further embodiment of the invention.

Another mounting arrangement is illustrated in FIG. 13 wherein the elongated sensor is vertically disposed along a path of travel of an object being monitored, with the sensor being maintained in tension. Referring to FIG. 13, there is shown a sensor 210 attached at its upper end to a support member 211 by a coupling 212 and connected at its lower end to a support member 213 by means of a coupling 214 affixed to the lower end of sensor 210 and attached to support 213 by a tension spring 215. A mounting channel is not employed in this embodiment and sensor 210 is vertically disposed and is supported only at its extremities, as illustrated. The base strip of sensor 210 in this embodiment is of high tensile strength to allow free vertical support of the sensor without ancillary mounting hardware along the sensor length.

Actuation of the freely disposed sensor is accomplished by a pinch roller assembly 216 which includes a pair of pinch rollers 217 and 218 suitably mounted for example by plate 219 for engagement with respective opposite sides of sensor 210. One of the rollers engages the active surface of sensor 210 while the other roller engages the opposite surface, the rollers being cooperative to provide an actuation force to the sensor as the roller assembly is moved along the path of travel associated with the sensor. For purposes of illustration, roller assembly 216 is shown attached to an elevator car 220 arranged for vertical movement along the length of sensor 210. A particular advantage of the mounting arrangement illustrated in FIG. 13 is that sensor 210 can accommodate lateral sway of elevator car 220, or other object with which the invention is employed. Moreover, this mounting arrangement is economical as the sensor is freely supported along a path without need for elaborate support structure. The sensor 210 is quite resilient in a direction lateral to its longitudinal axis and can accommodate lateral sway without affecting system performance. Depending upon the extent of lateral motion expected in particular installations, suitable mounting of the vertically disposed sensor 210 can be provided accordingly. For example, the upper and lower mounting elements for sensor 210 can include swivel or other couplings which permit the required lateral movement.

Electrical connection of the sensor to associated circuitry can be provided in either a two-wire rheostat configuration or a three-wire potentiometer configuration to suit particular operating requirements. In the two-wire rheostat configuration, electrical connection is made to the conductive base strip and to one end of the helically wound resistance wire to provide an output resistance the magnitude of which varies directly with the position of an actuating force applied to the sensor. In the three-wire potentiometer configuration, electrical connection is made to the conductive base strip and to both ends of the helical resistance wire. In this latter case, the base strip connection acts as the wiper or movable potentiometer to provide a voltage which directly varies in accordance with the position of an actuating force applied along the sensor length.

For purposes of position indication, the invention can be employed as a linear rheostat to provide a variable resistance directly related to the position of an actuating force along the length of the sensor, or as a linear potentiometer to provide a variable voltage which is related to the voltage applied across the helical resistance element and which is directly related to the position of an actuating force along the sensor length. The sensor output resistance or voltage can be applied to an output meter which can be calibrated to indicate distance or position directly.

It will be appreciated that the invention provides an extremely simple and effective means for position monitoring and control in which signals are derived from a single continuous sensor disposed along the path of travel and requiring but two or three lead wires for system connection. A particular advantage of the invention is that in practice a given installation can be expanded to an automatic positioning system without any change in the sensor or sensor wiring. The accuracy of the system is determined by the overall sensor length and by the density of the helical resistance windings. In a typical sensor construction there are 48 winding turns per foot, providing a theoretical resolution of ±½ inch. As sensor length increases beyond 100 feet or more, the output circuitry may have difficulty preserving this resolution, and additional lead wires may be tapped off the resistance helix to lessen the span of the metering range. For extremely long paths of travel, for example measuring thousands of feet in length, it may be useful to provide a multiple zone system, to be described below, each zone having its own excitation to maintain the desired accuracy within each zone. Electronic circuitry can be provided in a well known manner to ascertain which zone is being employed at any particular instant.

The sensor provides an output signal which can be employed both to produce an output indication of position with respect to a path of travel and to provide control of the motion of an object along the path of travel. Since continuous position information is derived by means of the invention, the speed of an object along a path of travel can be easily controlled. The invention is useful in single-speed control systems and in stepwise multiple-speed systems, as well as for smooth proportional speed control. A single sensor can provide necessary signals for versatile velocity control utilizing only two or three lead wires depending upon the type of sensor connection employed. For example, the invention can be implemented to provide control of a moving vehicle at high, medium and low speeds depending upon the signal level received from the sensor. At predetermined distances from a stopping point, the velocity would change to the next lower level until at a predetermined distance the vehicle would be stopped by removing the energizing power and applying suitable braking.

In those instances where the velocity and mass of a moving object are known, the stopping point of the object along a path of travel can be precisely determined in a simple open loop system. The point along the path of travel at which energizing power is removed and braking power applied can be precisely determined in accordance with the invention since continuous position information is provided by the level of output signals provided by the novel sensor. And since continuous output position information is provided, the stopping point can be easily adjusted to suit particular system configurations.

Stopping along the path of travel is achieved by comparing a voltage provided by the sensor with a reference voltage in a differential amplifier. Stopping points are easily changed by altering the reference voltage level which is being compared with the voltage output signal from the novel sensor. Such flexibility of control is not possible with conventional systems utilizing point position sensors without physically moving the sensors and/or providing additional wiring to the individual point position sensors provided along the path.

Figure 14:
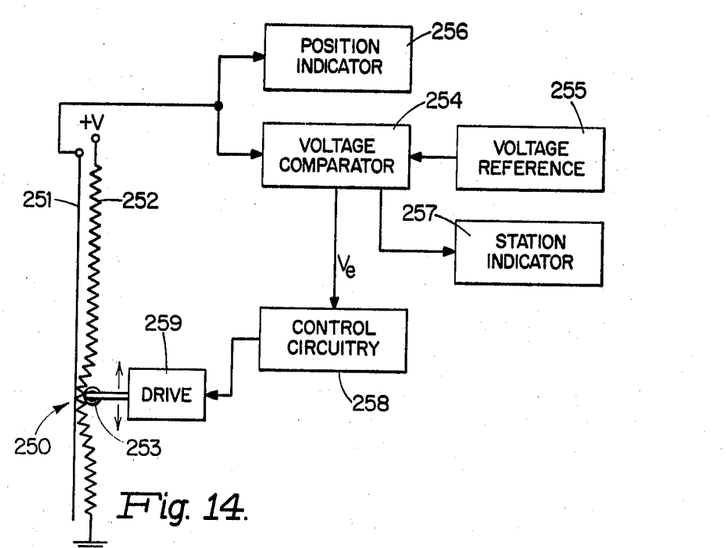
FIG. 14 is a schematic representation of an indication and control system embodying the invention.

FIG. 14 shows operation of the invention in a typical position indicating and control arrangement and includes the novel sensor 250 depicted schematically as a conductive strip 251 and an elongated resistance element 252 confronting conductive strip 251 and capable of selectively contacting the strip in response to an actuating force applied by contacting roller 253. The sensor is connected as a potentiometer with resistance element 252 connected between a source of reference potential +V and ground and with conductive strip 251 being connected to an input of a voltage comparator 254 and to a position indicator 256. A voltage reference source 255 provides a selected reference voltage to voltage comparator 254 representative of a predetermined position along the sensor. Voltage comparator 254 is operative to compare the voltages provided by reference source 255 and the output of sensor 250 and to provide an error voltage $V_e$ representative of the difference in the position of contacting roller 253 along the length of the sensor and the predetermined position. The error voltage can be employed to energize a station location indicator 257 when a predetermined position along the path of travel has been reached by actuating rollers 253. The error voltage can also be applied to control circuitry 258 operative to control energization of drive circuitry 259 which drives roller 253 and associated movable object along the path of travel. Position indicator 256 is responsive to the variable voltage provided by sensor 250 to display the position of actuating roller 253 along the length of sensor 250.

The invention is particularly useful to provide proportional speed control since continuous position determination is achieved even over relatively long paths of travel. Such proportional control can be accomplished in the manner illustrated in FIG. 15. The novel sensor is depicted schematically as a conductive strip 132 and an elongated resistance element 136 confronting conductive strip 134 and capable of selectively contacting strip 134 in response to an actuating force applied by contacting roller 138. Conductive strip 134 is connected to one input of a voltage comparator 140. One end of resistance wire 136 is connected to a source of excitation voltage, labeled +V, while the other end of resistance wire 136 is connected to a source of reference potential such as ground. A multi-tapped resistance element 142 is connected between the source of excitation voltage +V and ground, each of the taps 144 capable of being selectively connected to the second input of voltage comparator 140. A particular tap 144 is selected in accordance with a desired position to be ascertained from the sensor.

Figure 15:
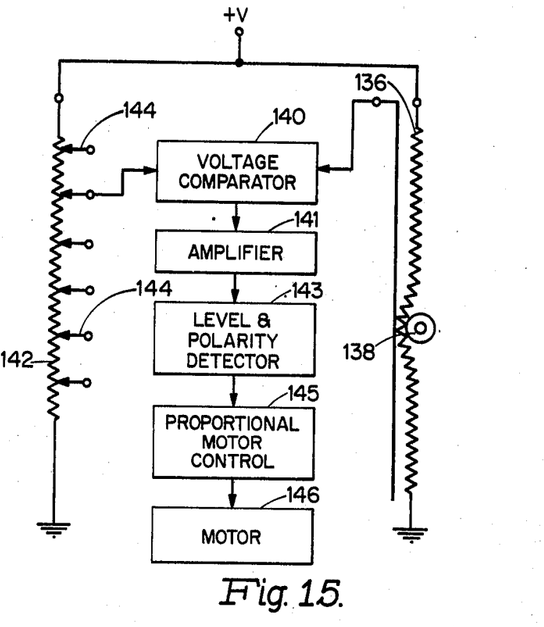
FIG. 15 is a schematic representation of a proportional control system embodying the invention.

Voltage comparator 140 is operative to compare the voltages provided by the selected reference tap 144 and the variable output of the sensor and to provide an error voltage for operation of a motor driving the object being controlled. The error voltage is amplified in amplifier 141, and the magnitude and polarity of the error voltage determined by level and polarity detector 143. The signal is next processed by motor control circuitry 145 which provides signals adapted to suitably drive motor 146 in selected modes of operation. The motor control circuitry per se is well known and need not be described in detail herein.

As actuating roller 138 moves toward a predetermined position, an error voltage of diminishing magnitude is produced by comparator 140 until the desired position is reached, at which time the error voltage becomes zero. Proportional motor control 145 is operative to drive motor 146 bidirectionally at a speed and direction corresponding to the applied error voltage provided by the unique position sensing system.

Figure 16:
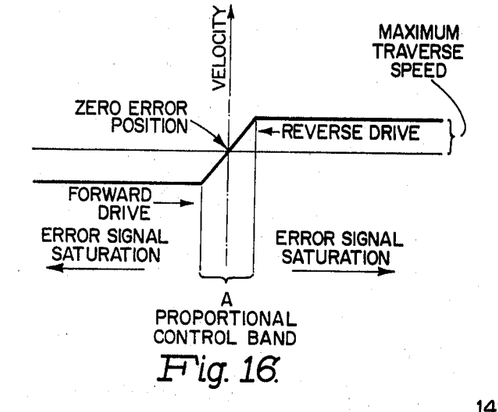
FIG. 16 is a plot of velocity versus error signal useful in illustrating operation of the proportional control system of FIG. 15.

Operation of the control system is best described with reference to FIG. 16 which depicts motor velocity versus error signal magnitude. As illustrated, for positive error signals outside of the central voltage range A, maximum reverse drive is applied to the motor, while maximum forward drive is applied to the motor when negative error signals are present outside of the voltage range A. For error signals within the voltage range A, motor drives of diminishing magnitude are applied depending upon the sense of the error signal to proportionally reduce motor velocity as zero error position is reached. At zero error position, of course, the motor is stopped.

Figure 17:
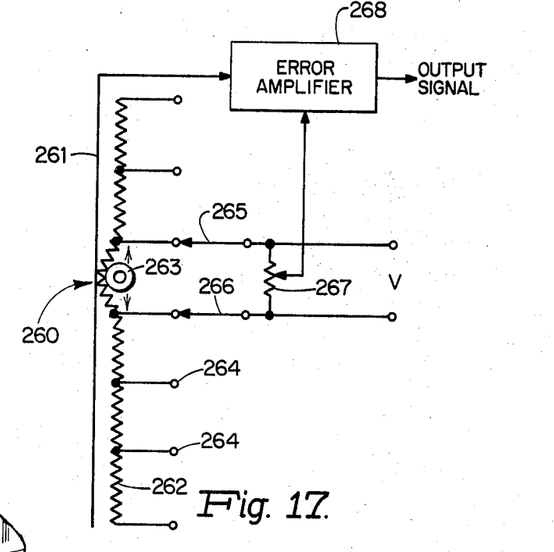
FIG. 17 is a schematic representation of a multiple zone control system embodying the invention.

As discussed hereinabove, a multiple zone position measuring system can be provided for extremely long paths of travel to achieve a desired measurement resolution. Such a system is illustrated in FIG. 17 and includes an elongated sensor 260 as described above and having a conductive strip 261 and resistance winding 262, with actuating roller 263 adapted for movement along the sensor. Roller 263 is coupled to an object movable along a path of travel associated with sensor 260 and whose position along the path is to be monitored and/or controlled. Winding 262 has a plurality of taps 264 along the length thereof, each adjacent pair of taps defining a sensor zone. Each zone is separately energized by a voltage V to provide enhanced accuracy of position measurement within the energized zone relative to the total sensor length. The excitation voltage is applied via contacts 265 and 266 which can be switched by well known means (not shown) to different adjacent pairs of taps 264 to energize different zones of sensor 260. Conductive strip 261 is connected to an input of error amplifier 268, the other input of which is derived from the energizing voltage V by means of resistive network 267. The output signal from amplifier 268 is a direct measure of the position of actuating roller 263 within the energized zone of sensor 260. The multiple zone arrangement can also be employed in conjunction with total sensor energization such as described herein, to provide course and fine position indication. And the course position signal can be employed with suitable control circuitry to automatically switch contacts 265 and 266 to selected different zones in accordance with the position of actuating roller 263.

Figure 18:
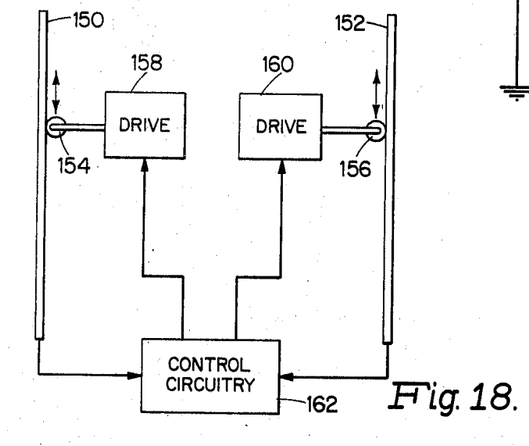
FIG. 18 is a schematic representation of a closed loop differential control system embodying the invention.

A further embodiment of the invention is shown in FIG. 18 and wherein first and second sensors are employed in a closed loop differential system configuration to provide a pair of dynamic output signals for position control. In many instances, it is necessary to control the positioning of two or more moving objects so that their motion along an intended path tracks within a predetermined tolerance. For example, in large overhead cranes which move along a rail, two separate motor drives are employed, one for each side of the crane. It will be appreciated that the motor drives must be precisely driven at the same rate in order to provide smooth translational movement of the crane on its supporting rails. Such position control can be easily implemented according to the invention in the manner illustrated in FIG. 18. A first sensor 150 is provided along the path of travel of a first moving object, while a second sensor 152 is provided along the path of travel of a second moving object whose motion is to be tracked with motion of the first moving object. The object whose position is to be sensed is coupled to respective activating rollers 154 and 156, and drive circuitry 158 and 160 is respectively provided for each movable object. The outputs of respective sensors 150 and 152 are applied to respective inputs of control circuitry 162 operative to apply control signals to respective drive circuits 158 and 160. The continuous position information provided by the invention permits the accurate control of the velocity and position of the two moving objects to permit movement in synchronism along the path of travel of the separately driven objects.

Figure 19:
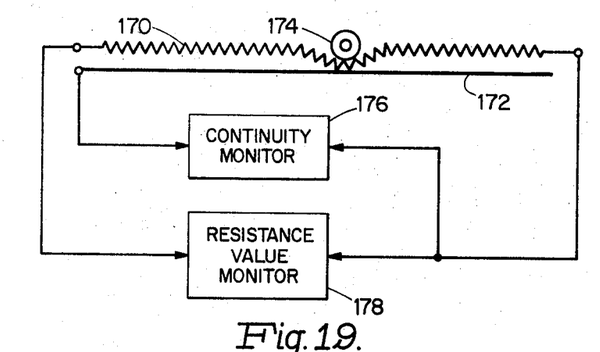
FIG. 19 is a schematic representation of a system monitoring system embodied in the invention.

A position sensing system according to the invention lends itself to self-monitoring by use of relatively simple circuitry employed in conjunction with the sensor and which does not interfere with normal system operation. Referring to FIG. 19, there is shown in schematic form a sensor, including resistance wire 170 and conductive base strip 172, resistance wire 170 being selectively connected to base strip 172 by means of an actuating roller 174. For purposes of self-checking, a continuity monitoring circuit 176 is connected between one terminal of resistance wire 170 and conductive base strip 172 while a resistance value monitoring circuit 178 is connected between respective opposite ends of resistance wire 170. The total resistance value of resistance wire 170 is measured by monitor 178, and changes in the total resistance value, such as would occur in the event of a break in the resistance wire or upon false actuation of the sensor by contact between the resistance wire and the base strip at more than one position, will cause monitor 178 to activate a suitable alarm indicator to thereby denote a system error condition. Continuity monitor 176 is operative to measure the resistance of the tape sensor as it varies over a predetermined range in accordance with the position of actuating roller 174. An open circuit condition, caused, for example, by failure of roller 174 to actuate the sensor, is easily detected by monitor 176 which can energize a suitable alarm indicative of the open circuit condition.

It will be appreciated that system monitoring as described hereinabove is accomplished by relatively simple circuitry connected to the sensor. Thus, the novel sensor which provides continuous and accurate position information over a path of travel also provides output signals to monitor system integrity. The system does not require any additional sensing apparatus to provide a self-checking capability and, moreover, such self-monitoring is accomplished without interference with system operation. This self-monitoring capability is particularly desirable in installations where large high-powered machines are operated by remote automatic control. Such machines can pose problems of safety and physical damage, which problems can be substantially eliminated by system error checking.

Figure 20:
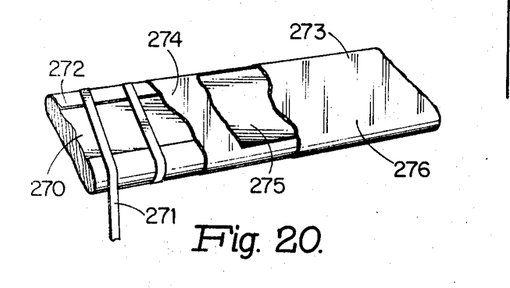
FIG. 20 is a pictorial view, partly cut away, of an alternative sensor construction according to the invention.

In some instances where the invention is employed, a movable object and its associated actuating roller may remain in a certain position for relatively long periods of time. For example, grain bin gate valves often remain closed for a period of months. During such prolonged periods, the pressure of the actuating roller on the sensor jacket may cause a set in the jacket which can detract from sensor performance. The sensor structure of FIG. 20 includes a jacket construction which substantially eliminates the possibility of jacket material set and is therefore especially useful in installations such as described immediately above. Referring to FIG. 20, the sensor includes an electrical system having a conductive base strip 270, and a resistance wire 271 helically wound therearound and insulated therefrom by insulating layer 272, as described hereinabove. A composite flexible jacket 273 includes an inner insulating layer 274 surrounding the electrical system, a metal strip 275 disposed along the side of the sensor containing the actuation zone defined by the uninsulated portion of insulation 272, and an outer layer 276. Metal strip 275 is of a width the same or less than the width of base strip 270 and greater than the width of the uninsulated channel defined by insulation 272. Strip 275 can be for example spring or stainless steel, and of a thickness typically 2-4 mils. The metal strip is secured to the layers 274 and 276 of the jacket such as by adhesive such that the strip provides additional spring action to the entire jacket structure and prevents possible permanent set of the jacket by prolonged pressure applied to a point thereon by an actuating roller. The strip 275 can be provided along the full sensor length or selectively in regions along the sensor where an actuating roller may be disposed for prolonged periods of time. For some applications, metal strip 275 can itself be the outermost element of the sensor jacket, while for other applications additional jacket layers can be provided to suit particular operating environments.

From the foregoing it should be evident that the invention provides a novel and relatively simple system for the effective determination and control of position along a predetermined path. The path of travel may be of straight line or curved configuration and positional information is provided in a precise and spatially-continuous manner throughout the length of the path. Various implementations of the sensor, output circuitry and system configuration can be provided to suit particular operating requirements and the invention is not to be limited by what has been particularly shown and described.

What is claimed is:

1. A continuous position determining system comprising:
   an elongated spatially continuous sensor disposed along a predetermined path of travel and mechanically actuable at any position along the length thereof, said sensor including
      an elongated continuous resistance element having a substantially constant total resistance value during system operation;
      an elongated electrically conductive strip substantially coextensive with said resistance element; and
      means for maintaining said conductive strip in normally spaced relationship with said resistance element;
   a jacket enclosing said sensor along the full length thereof and operative to isolate said sensor from the working environment and sealed to provide a substantially constant volume within said jacket during sensor operation;
   means for applying an energizing potential to said resistance element;
   means adapted for coupling to an object movable along said path of travel, said means being disposed for movement along the length of said sensor and operative to apply an actuating force to the outer surface of said jacket at any position along the length of said sensor to cause contact of confronting portions of said conductive strip and said resistance element at the position of said actuating force, thereby to provide a continuously variable resistance;
   means electrically connected only to an end of said conductive strip and only to at least one end of said resistance element and operative in response to said continuously variable resistance to provide a continuously variable signal directly related to the position of said actuating force; and
   output means coupled to said electrically connected means and operative in response to said continuously variable signal to provide an indication of the position of said object along said path of travel.

2. A system according to claim 30 wherein
   said maintenance means include insulation means partially surrounding and insulating said conductive strip with the exception of a full length exposed portion on one side thereof; and
   said resistance element includes a resistance wire helically wound around said conductive strip and insulated by said insulation means;
   said insulation means being adapted to maintain those segments of said resistance wire adjacent said exposed portion in normally spaced relationship with said conductive strip.

3. A system according to claim 1 including
   a resistance value monitor connected to respective opposite ends of said resistance element and operative to monitor the substantially constant total resistance value thereof during sensor operation.

4. A system according to claim 1 including
   a resistance value monitor connected to respective opposite ends of said resistance element and operative to monitor the substantially constant total resistance value thereof during sensor operation; and
   a continuity monitor connected between said conductive strip and one end of said resistance element and operative to monitor the resistance value of said sensor which varies in relation to the position of said actuating force.

5. A system according to claim 1 wherein said electrically connected means are connected to an end of said conductive strip and to both ends of said resistance element to provide a potentiometer configuration.

6. A system according to claim 1 wherein said actuating means includes a roller maintained for rolling contact with said sensor along the length thereof, and means for maintaining said roller in contact with said sensor with sufficient pressure to actuate said sensor.

7. A system according to claim 6 wherein said roller includes a resilient tire adapted for rolling contact with said sensor.

8. A system according to claim 1 wherein said actuating means includes a roller mounting for rolling contact with said sensor along the length thereof, said roller including a resilient tire dimensioned with respect to said exposed portion to cause actuation of said sensor at the point of contact between said roller and said sensor.

9. A system according to claim 1 wherein said actuating means includes a source of gas pressure disposed for movement along the length of said sensor and operative to direct a jet of gas onto said sensor to cause actuation thereof.

10. A system according to claim 1 wherein said actuating means includes a Rolamite disposed in juxtaposition with said sensor and adapted for rolling contact along the length thereof.

11. A system according to claim 1 including mounting means adapted for disposition along said path of travel and having said sensor disposed on said mounting means.

12. A system according to claim 11 wherein said mounting means includes an elongated channel having said sensor disposed on a surface thereof.

13. A system according to claim 1 wherein said sensor includes a plurality of segments each adapted for connection to a like segment.

14. A system according to claim 11 wherein said mounting means includes a relatively stiff backing member secured along the length of said sensor and substantially coextensive with the length and width thereof;
a resilient plastic sheath surrounding said sensor and said backing member; and
a mounting channel substantially coextensive with said sensor and having said backing member rigidly secured to a surface thereof.

15. A system according to claim 1 including mounting means adapted to support said elongated sensor in vertical tensioned disposition along a path of travel and wherein said actuating means includes a pinch roller assembly movable along the length of said sensor and adapted to engage respective opposite surfaces thereof.

16. A system according to claim 1 wherein said jacket is a composite flexible jacket including an inner insulating layer enclosing said base strip, insulation means and resistance wire, and a metal strip secured to said inner layer on the side confronting said exposed portion, said metal strip being operative to provide additional spring action to said jacket.

17. A continuous position determining system comprising:
a first elongated spatially continuous sensor disposed along a predetermined path of travel and having electrical connections only from at least one end thereof and operative in response to an energizing potential to provide a continuously variable signal directly related to the position of an actuating force applied to said sensor;
a second like sensor disposed along a portion of said predetermined path of travel operative in response to an energizing potential to provide a continuously variable signal directly related to the position of an actuating force applied to said second sensor;
means for applying an energizing potential to each of said first and second sensors;
first means disposed for movement along the length of said first sensor and operative to apply an actuating force thereto at any point along the length of said first sensor;
second means disposed for movement along the length of said second sensor and operative to apply an actuating force thereto at any point along the length of said second sensor;
said first and second means each being adapted for coupling to an object movable along said path of travel; and
circuitry operative in response to the signal of said first sensor to indicate the course position of said object along said path of travel, and operative in response to the signal of said second sensor to indicate the fine position of said object along said path of travel.

18. A position control system comprising:
first and second elongated spatially continuous sensors each disposed along a respective path of travel and each having electrical connections only from at least one end thereof and operative to provide a continuously variable signal directly related to the position of an actuating force applied thereto;
means for applying an energizing potential to each of said first and second sensors;
first and second actuating means each adapted for movement along the length of a respective sensor and each operative to apply an actuating force to said sensor;
first and second driving means each coupled to a respective actuating means and each operative to cause movement of said respective actuating means along the length of said sensors; and
control circuitry connected to said first and second sensors and operative in response to the signal provided by said sensors to provide control signals to said first and second drive means to cause synchronous operation thereof.

19. A continuous position determining system comprising:
an elongated spatially continuous sensor disposed along a predetermined path of travel and having electrical connections only from at least one end thereof and operative in response to an energizing potential to provide a continuously variable signal directly related to the position of an actuating force applied to said sensor;
means for applying an energizing potential to said sensor;
means adapted for coupling to an object movable along said path of travel, said means being disposed for movement along the length of said sensor and operative to apply an actuating force thereto at any position along the length of said sensor; and
output means coupled to said sensor and operative in response to said continuously variable signal for indicating the position of said object along said path of travel;
said sensor including a plurality of segments each adapted for connection to a like segment and including an inoperative end portion of predetermined dimension;
said actuating means including first and second rollers being separated by a distance sufficient to traverse said end portions to thereby provide an effectively continuous actuating force along the length of said sensor.

20. A continuous position determining system comprising:
an elongated spatially continuous sensor disposed along a predetermined path of travel and having electrical connections only from at least one end thereof and operative in response to an energizing potential to provide a continuously variable signal directly related to the position of an actuating force applied to said sensor;
said sensor including
an elongated electrically conductive base strip,
insulation means partially surrounding and insulating said base strip with the exception of a full length exposed portion on one side thereof, and
a resistance wire helically wound around said base strip and insulated therefrom by said insulation means,
said insulation means being adapted to maintain those segments of said resistance wire adjacent said exposed portion in normally spaced relationship from said base strip;
means for applying an energizing potential to said sensor;
means adapted for coupling to an object movable along said path of travel, said means being disposed for movement along the length of said sensor and operative to apply an actuating force thereto at any position along the length of said sensor;

output means coupled to said sensor and operative in response to said continuously variable signal for indicating the position of said object along said path of travel; and first and second end windings each wound around a respective end portion of said sensor, and each adapted for coupling to circuitry and operative to provide an end-of-travel indication upon actuation of either of said end windings by said actuating means.

21. A continuous position determining system comprising:

an elongated spatially continuous sensor disposed along a predetermined path of travel and having electrical connections only from at least one end thereof and operative in response to an energizing potential to provide a continuously variable signal directly related to the position of an actuating force applied to said sensor;

said sensor including
an elongated electrically conductive base strip,
insulation means partially surrounding and insulating said base strip with the exception of a full length exposed portion on one side thereof, and
a resistance wire helically wound around said base strip and insulated therefrom by said insulation means,
said insulation means being adapted to maintain those segments of said resistance wire adjacent said exposed portion in normally spaced relationship from said base strip;

means for applying an energizing potential to said sensor;
means adapted for coupling to an object movable along said path of travel, said means being disposed for movement along the length of said sensor and operative to apply an actuating force thereto at any position along the length of said sensor;
output means coupled to said sensor and operative in response to said continuously variable signal for indicating the position of said object along said path of travel;
drive means coupled to said actuating means and operative to move said actuating means along said path; and
control means coupled to the conductive base strip and the resistance wire of said sensor and operative in response to said sensor to provide signals to said drive means for controlling the operation thereof in accordance with the position of said actuating means along said path.

22. A system according to claim 21 wherein said control means includes
a source of voltage reference signals representing a predetermined position along said path;
a voltage comparator coupled to said sensor and to said reference source and operative to provide an error signal representing the difference between the position of said actuating means and said predetermined position; and
control circuitry operative in response to said error signal to cause said drive means to move said actuating means to said predetermined position.

23. A system according to claim 22 wherein said control circuitry includes proportional control circuitry for controlling operation of said drive means in a manner related to the distance between said predetermined position and the position of said actuating means.

24. A continuous position determining system comprising:

an elongated spatially continuous sensor disposed along a predetermined path of travel and having electrical connections only from at least one end thereof and operative in response to an energizing potential to provide a continuously variable signal directly related to the position of an actuating force applied to said sensor;

said sensor including
an elongated electrically conductive base strip,
insulation means partially surrounding and insulating said base strip with the exception of a full length exposed portion on one side thereof,
a resistance wire helically wound around said base strip and insulated therefrom by said insulation means,
said insulation means being adapted to maintain those segments of said resistance wire adjacent said exposed portion in normally spaced relationship from said base strip, and
a plurality of taps provided along the length of said resistance wire each adjacent pair of taps defining a sensor zone;

means for applying an energizing potential to a selected zone;
means adapted for coupling to an object movable along said path of travel, said means being disposed for movement along the length of said sensor and operative to apply an actuating force thereto at any position along the length of said sensor; and
output means coupled to said sensor and operative in response to said continuously variable signal for providing an indication of the position of said actuating means along said path of travel and within said selected sensor zone.

* * * * *